(12) United States Patent
Akita

(10) Patent No.: US 8,812,471 B2
(45) Date of Patent: Aug. 19, 2014

(54) DATABASE, PROCESS FLOW DATA MANAGEMENT SERVER, AND PROCESS FLOW DATA MANAGING PROGRAM PRODUCT

(75) Inventor: Toshifumi Akita, Hyogo (JP)

(73) Assignee: IPS Co., Ltd., Osaka (JP)

( * ) Notice: Subject to any disclaimer, the term of this patent is extended or adjusted under 35 U.S.C. 154(b) by 21 days.

(21) Appl. No.: 13/574,384

(22) PCT Filed: Apr. 22, 2011

(86) PCT No.: PCT/JP2011/002352
§ 371 (c)(1),
(2), (4) Date: Sep. 19, 2012

(87) PCT Pub. No.: WO2012/086097
PCT Pub. Date: Jun. 28, 2012

(65) Prior Publication Data
US 2013/0006917 A1    Jan. 3, 2013

(30) Foreign Application Priority Data

Dec. 21, 2010   (JP) .................................. 2010-284507

(51) Int. Cl.
*G06F 17/30* (2006.01)
*G06Q 30/06* (2012.01)

(52) U.S. Cl.
CPC ..................................... *G06Q 30/06* (2013.01)
USPC ........................................ 707/705; 705/7.27

(58) Field of Classification Search
CPC ..................... G06F 17/30002; G06F 17/30289
See application file for complete search history.

(56) References Cited

U.S. PATENT DOCUMENTS

| 6,275,809 B1 | 8/2001 | Tamaki et al. |
| 2001/0008998 A1 | 7/2001 | Tamaki et al. |

FOREIGN PATENT DOCUMENTS

| JP | 8-203794 | 8/1996 |
| JP | 08-203794 | 8/1996 |
| JP | 10-214113 | 8/1998 |
| JP | 2002-312208 | 10/2002 |
| JP | 2003-296560 | 10/2003 |
| JP | 2003-323582 | 11/2003 |
| JP | 2007-200136 | 8/2007 |
| JP | 2009-099070 | 5/2009 |

OTHER PUBLICATIONS

U.S. Appl. No. 13/574,395 to Toshifumi Akita, filed Jul. 20, 2012.
Japan Office action, dated Jul. 2, 2013 along with an english translation thereof.
Lefty Leverenz et al., "An example of how Oracle works", Oracle 8I Concepts, Release 8.1.5, vol. 1, XP002292551, Feb. 1, 1999, pp. 1-21-10-21.
Search report from E.P.O., mail date is Sep. 4, 2013.

*Primary Examiner* — Hung Q Pham
(74) *Attorney, Agent, or Firm* — Greenblum & Bernstein, P.L.C.

(57) ABSTRACT

A processing load required for updating and searching data is to be reduced in an ERP system.

A database is configured so as to include: a process flow table PT in which process flow data containing various kinds of data regarding a process flow including a plurality of business processes are registered; and an update condition table UT in which update condition data indicating an update condition of the process flow data are registered, wherein the process flow data contain status data indicating a progress situation of each of a plurality of business processes included in the process flow, common data common among business processes included in the same process flow, and process unique data unique to each of the business processes included in the same process flow; wherein the status data are updated in the case where the process unique data are updated; and the update condition data are data indicating a state of the status data.

2 Claims, 11 Drawing Sheets

Fig. 2

| | MAIN KEY SECTION | | REFERENCE KEY SECTION | | TYPE SECTION |
|---|---|---|---|---|---|
| | PROCESS FLOW NUMBERS | PROCESS FLOW DESCRIPTION NUMBERS | REFERENCE NUMBERS | REFERENCE DESCRIPTION NUMBERS | TYPES | ... |
| | 000001 | 0010 | | 0010 | INVENTORY SALES | ... |
| | 000001 | 0020 | 000001 | 0010 | INVENTORY SALES | ... |
| | 000002 | 0010 | 000001 | 0020 | INVENTORY SALES | ... |
| | 000003 | 0010 | 000002 | 0010 | CHANGE OF NAMES (SALES) | ... |
| | ... | ... | ... | ... | ... | ... |

STATUS SECTION

| RECEIVED ORDER | SHIPMENT INSTRUCTION | DELIVERY | DELIVERY ACCEPTANCE INSPECTION | SALES | ... |
|---|---|---|---|---|---|
| 1 | 0 | 0 | 0 | 0 | ... |
| 1 | 0 | 0 | 0 | 0 | ... |
| 1 | 0 | 0 | 0 | 0 | ... |
| ... | ... | ... | ... | ... | ... |

COMMON DATA SECTION

| ORDERING PARTY | ... | AMOUNT OF MONEY | ORDER RECEIVED DATE |
|---|---|---|---|
| T001 | ... | 1200 | 2010/11/1 |
| T001 | ... | 2600 | 2010/11/1 |
| T002 | ... | 4200 | 2010/11/1 |
| T002 | ... | 4200 | 2010/11/1 |
| ... | ... | ... | ... |

PROCESS UNIQUE DATA SECTION

| RECEIVED ORDER TEXT | SHIPMENT INSTRUCTION DATE | SHIPMENT TEXT | DELIVERY DATE | DELIVERY TEXT | ACCEPTANCE INSPECTION DATE | ACCEPTANCE INSPECTION TEXT | SALES DATE | SALES TEXT |
|---|---|---|---|---|---|---|---|---|
| NO LATER THAN DELIVERY DEADLINE | | | | | | | | ... |
| ... | ... | ... | ... | ... | ... | ... | ... | ... |

PT: PROCESS FLOW TABLE

Fig. 3

UPDATE CONDITION TABLE

| PROCESS | TYPE | PROCESS FLOW DATA UPDATING CONDITION ||||| 
|---|---|---|---|---|---|---|
| | | RECEIVED ORDER | SHIPMENT INSTRUCTION | DELIVERY | DELIVERY ACCEPTANCE INSPECTION | SALES |
| DELIVERY ACCEPTANCE INSPECTION | INVENTORY SALES | 1 | 1 | 1 | – | – |
| DELIVERY ACCEPTANCE INSPECTION | CHANGE OF NAMES (SALES) | 1 | – | – | – | – |
| DELIVERY ACCEPTANCE INSPECTION | RETURNED GOODS OF SALES (REFERENCE OF ORIGINAL TRANSACTION) | – | – | 1 | – | – |
| DELIVERY ACCEPTANCE INSPECTION | RETURNED GOODS OF SALES (NO REFERENCE OF ORIGINAL TRANSACTION) | 1 | – | 1 | – | – |
| SALES | INVENTORY SALES | 1 | 1 | 1 | 1 | – |
| SALES | SERVICE SALES | 1 | – | – | – | – |
| SALES | CHANGE OF NAMES (SALES) | 1 | – | – | 1 | – |
| SALES | RETURNED GOODS OF SALES (REFERENCE OF ORIGINAL TRANSACTION) | – | – | 1 | 1 | – |
| SALES | RETURNED GOODS OF SALES (NO REFERENCE OF ORIGINAL TRANSACTION) | 1 | – | 1 | 1 | – |
| SALES | ADJUSTMENT OF SALE PROCEEDS (PLUS) | – | – | – | – | – |
| SALES | ADJUSTMENT OF SALE PROCEEDS (MINUS) | – | – | – | – | – |

Fig. 6

PROCESS FLOW DATA UPDATING REQUEST INPUT SCREEN

UPDATE TARGET (PROCESS FLOW DATA)

11 — PROCESS FLOW NUMBER: _____
PROCESS FLOW DESCRIPTION NUMBER: _____

PROCESS DATA:BUSINESS PROCESS [DELIVERY ACCEPTANCE INSPECTION ▽] — 12

13 — ACCEPTANCE INSPECTION DATE: ☐ / ☐ / ☐
ACCEPTANCE INSPECTION TEXT: _____

[RETURN]   [UPDATE]
14        P      15

Fig. 7

PROCESS FLOW DATA UPDATING REQUEST INPUT SCREEN

UPDATE TARGET (PROCESS FLOW DATA)

PROCESS FLOW NUMBER: _____

21 — Update of process flow data cannot be accepted because update condition is not satisfied.

22 — [DISPLAY DETAILS]   [CLOSE] — 23

[RETURN]   [UPDATE]
P

Fig. 10

COMPARISON RESULT OF AMOUNT OF UPDATED DATA
AT THE TIME OF INPUT OF FIRST PROCESS DATA

10A

|  | CONVENTIONAL FORM | NEW FORM PROCESS FLOW TABLE | DIFFERENCE OF AMOUNT OF DATA (NEW FORM − CONVENTIONAL FORM) |
|---|---|---|---|
| MAIN KEY SECTION | ○ UPDATE | ○ UPDATE | 0 |
| REFERENCE KEY SECTION | ○ UPDATE | ○ UPDATE | 0 |
| TYPE SECTION | ○ UPDATE | ○ UPDATE | 0 |
| STATUS SECTION | NO CORRESPONDING DATA | ○ UPDATE | +(PLUS) |
| COMMON DATA SECTION | ○ UPDATE | ○ UPDATE | 0 |
| PROCESS UNIQUE DATA SECTION | ○ UPDATE | ○ UPDATE | 0 |

COMPARISON RESULT OF AMOUNT OF UPDATED DATA
AT THE TIME OF INPUT OF PROCESS DATA AFTER SECOND PROCESS

10B

|  | CONVENTIONAL FORM | NEW FORM PROCESS FLOW TABLE | DIFFERENCE OF AMOUNT OF DATA (NEW FORM − CONVENTIONAL FORM) |
|---|---|---|---|
| MAIN KEY SECTION | ○ UPDATE | × NO UPDATE | −(MINUS) |
| REFERENCE KEY SECTION | ○ UPDATE | × NO UPDATE | −(MINUS) |
| TYPE SECTION | ○ UPDATE | × NO UPDATE | −(MINUS) |
| STATUS SECTION | NO CORRESPONDING DATA | ○ UPDATE | +(PLUS) |
| COMMON DATA SECTION | ○ UPDATE | × NO UPDATE | −(MINUS) |
| PROCESS UNIQUE DATA SECTION | ○ UPDATE | ○ UPDATE | 0 |

Fig. 11

PROGRESS SITUATION DETERMINING CONDITION TABLE

| TYPE | PROGRESS SITUATION DETERMINING CONDITION | | | | |
|---|---|---|---|---|---|
| | RECEIVED ORDER | SHIPMENT INSTRUCTION | DELIVERY | DELIVERY ACCEPTANCE INSPECTION | SALES |
| INVENTORY SALES | 1 | 1 | 1 | 1 | 1 |
| SAMPLE SHIPMENT | 1 | 1 | 1 | – | – |
| SERVICE SALES | 1 | – | – | – | 1 |
| CHANGE OF NAMES (SALES) | 1 | – | – | 1 | 1 |
| CHANGE OF NAMES (SHIPMENT) | – | 1 | 1 | – | – |
| RETURNED GOODS OF SALES (REFERENCE OF ORIGINAL TRANSACTION) | – | – | 1 | 1 | 1 |
| RETURNED GOODS OF SALES (NO REFERENCE OF ORIGINAL TRANSACTION) | 1 | – | 1 | 1 | 1 |
| ADJUSTMENT OF SALE PROCEEDS (PLUS) | – | – | – | – | 1 |
| ADJUSTMENT OF SALE PROCEEDS (MINUS) | – | – | – | – | 1 |
| ⋮ | ⋮ | ⋮ | ⋮ | ⋮ | ⋮ |

| RECEIVED ORDER NUMBER | RECEIVED ORDER DESCRIPTION NUMBER | TYPE | ORDERING PARTY | ... |
|---|---|---|---|---|
| A00001 | 0010 | INVENTORY SALES | T001 | ... |
| A00001 | 0020 | INVENTORY SALES | T001 | ... |
| A00002 | 0010 | INVENTORY SALES | T002 | ... |

| | QUANTITY | AMOUNT OF MONEY | ORDER RECEIVED DATE | RECEIVED ORDER TEXT |
|---|---|---|---|---|
| ... | 10 | 1200 | 2010/11/1 | NO LATER THAN DELIVERY DEADLINE |
| | 20 | 2600 | 2010/11/1 | |
| | 30 | 4200 | 2010/11/1 | |

12B

| SHIPMENT INSTRUCTION NUMBER | SHIPMENT INSTRUCTION DESCRIPTION NUMBER | TYPE | ORDERING PARTY | ... |
|---|---|---|---|---|
| B00004 | 0010 | INVENTORY SALES | T001 | ... |
| B00004 | 0020 | INVENTORY SALES | T001 | ... |
| B00005 | 0010 | INVENTORY SALES | T002 | ... |

| | QUANTITY | AMOUNT OF MONEY | SHIPMENT INSTRUCTION DATE | SHIPMENT TEXT | RECEIVED ORDER NUMBER | RECEIVED ORDER DESCRIPTION NUMBER |
|---|---|---|---|---|---|---|
| ... | 10 | 1200 | 2010/11/14 | FRAGILE | A00001 | 0010 |
| | 20 | 2600 | 2010/11/14 | | A00001 | 0020 |
| | 30 | 4200 | 2010/11/25 | | A00002 | 0010 |

12C

| DELIVERY NUMBER | DELIVERY DESCRIPTION NUMBER | TYPE | ORDERING PARTY | ... |
|---|---|---|---|---|
| C00007 | 0010 | INVENTORY SALES | T001 | ... |
| C00007 | 0020 | INVENTORY SALES | T001 | ... |
| C00008 | 0010 | INVENTORY SALES | T002 | ... |

| | QUANTITY | AMOUNT OF MONEY | DELIVERY DATE | DELIVERY TEXT | SHIPMENT INSTRUCTION NUMBER | SHIPMENT INSTRUCTION DESCRIPTION NUMBER |
|---|---|---|---|---|---|---|
| ... | 10 | 1200 | 2010/11/15 | | B00004 | 0010 |
| | 20 | 2600 | 2010/11/15 | | B00004 | 0020 |
| | 30 | 4200 | 2010/11/26 | | B00005 | 0010 |

| ACCEPTANCE INSPECTION NUMBER | ACCEPTANCE INSPECTION DESCRIPTION NUMBER | TYPE | ORDERING PARTY | ... |
|---|---|---|---|---|
| D00010 | 0010 | INVENTORY SALES | T001 | ... |
| D00010 | 0020 | INVENTORY SALES | T001 | ... |
| D00011 | 0010 | INVENTORY SALES | T002 | ... |

| QUANTITY | AMOUNT OF MONEY | ACCEPTANCE INSPECTION DATE | ACCEPTANCE INSPECTION TEXT | DELIVERY NUMBER | DELIVERY DESCRIPTION NUMBER |
|---|---|---|---|---|---|
| 10 | 1200 | 2010/11/16 | | C00007 | 0010 |
| 20 | 2600 | 2010/11/16 | | C00007 | 0020 |
| 30 | 4200 | 2010/11/27 | | C00008 | 0010 |

13B

| SALES NUMBER | SALES DESCRIPTION NUMBER | TYPE | ORDERING PARTY | ... |
|---|---|---|---|---|
| E00003 | 0010 | INVENTORY SALES | T001 | ... |
| E00003 | 0020 | INVENTORY SALES | T001 | ... |
| E00004 | 0010 | INVENTORY SALES | T002 | ... |

| QUANTITY | AMOUNT OF MONEY | SALES DATE | SALES TEXT | ACCEPTANCE INSPECTION NUMBER | ACCEPTANCE INSPECTION DESCRIPTION NUMBER |
|---|---|---|---|---|---|
| 10 | 1200 | 2010/11/16 | | D00010 | 0010 |
| 20 | 2600 | 2010/11/16 | | D00010 | 0020 |
| 30 | 4200 | 2010/11/27 | | D00011 | 0010 |

DATABASE, PROCESS FLOW DATA MANAGEMENT SERVER, AND PROCESS FLOW DATA MANAGING PROGRAM PRODUCT

CROSS REFERENCE TO RELATED APPLICATIONS

The present application is a U.S. national phase application under 35 U.S.C. §371 of PCT Application No. PCT/JP2011/002352, filed on Apr. 22, 2011, and claims priority to and incorporates by reference Japanese Patent Application No. 2010-284507, filed on Dec. 21, 2010.

TECHNICAL FIELD

The present invention relates to a database available in an ERP system, a data management server including this database, and a data managing program product mounted on the data management server.

BACKGROUND ART

Heretofore, one so-called ERP (Enterprise Resource Planning) has been utilized as package software for establishing a core business system for a company.

As a system on which this ERP is mounted, one that causes core businesses in a company such as sales management, purchase management, inventory management, production management, financial accounting, managerial accounting to cooperate with each other in real time, whereby information on each of the businesses is managed in an integrated fashion, is well known.

In such a system (ERP system or integrated core business system), for example, there is also a data converting apparatus, which is connected to both an integrated business system that carries out information control of management resources and carries out communication of information with a first data format defined in advance and a plurality of information apparatuses each of which carries out communication of information with a second data format that is different from the first data format. By configuring the system so as to incorporate thereinto the data converting apparatus that receives an input of information with the first data format outputted from the integrated business system; converts the format of the received information into the second data format; and transmits the converted information to the information apparatus, convenience of the system is to be heightened (see Patent Literature 1).

PRIOR ART LITERATURE

Patent Literature

Patent Literature 1: Japanese Patent Application Publication No. 2009-099070

SUMMARY OF THE INVENTION

Problems to be Solved by the Invention

However, a conventional ERP system respectively registers data (containing data inputted by a user and data calculated from various kinds of data) acquired in each business process in dedicated data tables (tables) and manages the registered data. Namely, in the conventional ERP system, a table to be updated is different from the others for every input process such as a received order and a shipment instruction. In this regard, the "input process" means a process to input various kinds of data acquired (or determined) by a manager of the ERP system into the respective tables in the business processes.

FIGS. 12 and 13 are explanatory drawings explaining an example of a table configuration in a conventional ERP system. For example, in the case where a business flow (process flow) constituted by a plurality of business processes denotes "inventory sales", there are five input processes including a received order, a shipment instruction, delivery, acceptance inspection, and sales. In this case, there are five tables for storing data on the process flow of the "inventory sales", including a received order table, a shipment instruction table, a delivery table, an acceptance inspection table and a sales table for each of the input processes, for example, as shown in FIGS. 12A to 12C, FIGS. 13A and 13B.

Namely, in the conventional ERP system, the tables updated for every input process have been different from each other. For that reason, association among a plurality of business processes that belong to the same process flow has been carried out by applying an identifier (in FIGS. 12 and 13, a received order number and received order description number in the shipment instruction table, a shipment instruction number and shipment instruction description in the shipment table, and the like) to the data (process data) regarding the respective business processes.

For that reason, in the conventional ERP system, specification of a table according to a kind of input process and an input of an identifier for other corresponding process data have been required for one input process. Namely, for example, in the case where process data regarding a business process "shipment instruction" related to process data specified by a received order number "A00001" and a received order description number "0010" (that is, various kinds of data stored in the same row as the received order number "A00001" and the received order description number "0010" in the received order table) are registered in a database included in the ERP system as shown in FIGS. 12 and 13, there is a need to register the received order number "A00001" and the received order description number "0010" in the shipment instruction table as the process data regarding the business process "shipment instruction" in addition to a shipment instruction number and a shipment instruction description number for specifying the process data, a type indicating a kind of business process, and data indicating the content of the business process (for example, an ordering party, quantity, the amount of money, shipment instruction date, a shipment text and the like). This is a problem in view of effective data processes (for example, data a part of which is the same (for example, an ordering party or quantity, the amount of money, or the like) are registered in the plurality of tables.

Further, in the conventional ERP system, in the case where a report according to a request of a user is created using various kinds of data stored in various kinds of tables, there is a need to search necessary process data by tracking an identifier of process data and to acquire them separately. For this reason, there has been a problem that a processing load required for outputting the report regarding the process flow becomes excessive in the case where the process flow contains a large number of business processes.

It is an object of the present invention to resolve the problems described above and to reduce a processing load required for updating and/or searching data in an ERP system.

Means for Solving the Problems

According to the present invention, there is provided a database including: a process flow table, process flow data being registered in the process flow table, the process flow data containing various kinds of data on a process flow including a plurality of business processes; and an update condition table, update condition data being registered in the update condition table, the update condition data indicating an update condition of the process flow data, wherein the process flow data are data containing status data, common data and process unique data, wherein the status data are data indicating a progress situation of each of a plurality of business processes included in the process flow, wherein the common data are data common among business processes included in the same process flow, wherein the process unique data are data unique to each of the business processes included in the same process flow, wherein the status data are updated in the case where the process unique data are updated, and wherein the update condition data are data indicating a state of the status data.

By configuring it as described above, it becomes possible to reduce a processing load required for updating and/or searching data in an ERP system.

The database may be configured so as to be provided in a process flow data management server that manages the process flow data generated for every process flow and so that the process flow data management server includes a process flow data providing section for providing a part or all of the process flow data to a client terminal in response to a request from the client terminal.

The database may be configured so that the process flow data management server includes: a process status receiving section for receiving an input of a process status, the process status being data of each of the plurality of business processes; a register determining section for determining whether the process status received by the process status receiving section is registered as a part of the process flow data or not on the basis of the update condition data; and a process flow data updating section for updating the process flow data registered in the process flow table in the case where the register determining section determines that the process status is to be registered.

The database may be configured so that the process flow data management server includes: an unsatisfaction update condition specifying section for specifying an unsatisfaction update condition in the case where the register determining section determines that the process status is not to be registered, the unsatisfaction update condition being an update condition that has not been satisfied; an informing section for informing the client terminal of the unsatisfaction update condition specified by the unsatisfaction update condition specifying section; and a satisfaction determining section for determining whether the update condition specified as the unsatisfaction update condition is satisfied at predetermined timing or not, wherein the process flow data updating section registers a process status corresponding to the update condition in the process flow table in the case where the satisfaction determining section determines that the update condition specified as the unsatisfaction update condition is satisfied.

Further, according to the present invention, there is provided a data management server for providing various kinds of data to a client terminal, the data management server including: a process flow data storage section for storing process flow data containing various kinds of data on a process flow and update condition data indicating an update condition of the process flow data, the process flow containing a plurality of business processes; a process flow data updating section for updating the process flow data in accordance with a progress situation of the process flow; and a process flow data providing section for providing, to the client terminal, a part or all of the process flow data in response to a request from the client terminal, wherein the process flow data are data containing status data, common data and process unique data, wherein the status data are data indicating a progress situation of each of a plurality of business processes included in the process flow, wherein the common data are data common among business processes included in the same process flow, wherein the process unique data are data unique to each of the business processes included in the same process flow, wherein the update condition data are data indicating a state of the status data, and wherein the process flow data updating section updates the process flow data on the basis of the update condition data.

Moreover, according to the present invention, there is provided a data managing program product for controlling an operation of a data management server so as to provide various kinds of data to a client terminal, the data managing program product causing the data management server to execute: a process flow data updating process to update process flow data stored in a process flow data storage section in accordance with a progress situation of a process flow, the process flow data storage section storing therein process flow data containing various kinds of data on the process flow and update condition data indicating an update condition of the process flow data, the process flow containing a plurality of business processes; and a process flow data providing process to provide, to the client terminal, a part or all of the process flow data in response to a request from the client terminal, wherein the process flow data are data containing status data, common data and process unique data, wherein the status data are data indicating a progress situation of each of a plurality of business processes included in the process flow, wherein the common data are data common among business processes included in the same process flow, wherein the process unique data are data unique to each of the business processes included in the same process flow, wherein the update condition data are data indicating a state of the status data, and wherein, in the process flow data update process, the data management server is caused to execute a process to update the process flow data on the basis of the update condition data.

Effects of the Invention

According to the present invention, it becomes possible to reduce a processing load required to update and/or search data in an ERP system.

BRIEF DESCRIPTION OF THE DRAWINGS

FIG. 2 is an explanatory drawing showing an example of a storage state of process flow data.

FIG. 3 is an explanatory drawing showing an example of a storage state of update condition data.

FIG. 6 is an explanatory drawing showing an example of a process flow data updating request input screen.

FIG. 7 is an explanatory drawing showing an example of an update error notification display screen.

FIG. 10 is an explanatory drawing explaining usefulness of a database updating process.

FIG. 11 is an explanatory drawing showing an example of a storage state of progress situation determining condition data.

FIG. 12 is an explanatory drawing explaining an example of a table configuration in a conventional ERP system.

FIG. 13 is an explanatory drawing explaining an example of a table configuration in a conventional ERP system.

MODE FOR CARRYING OUT THE INVENTION

Hereinafter, an example of one embodiment according to the present invention will be described with reference to the drawings.

Figure 1:
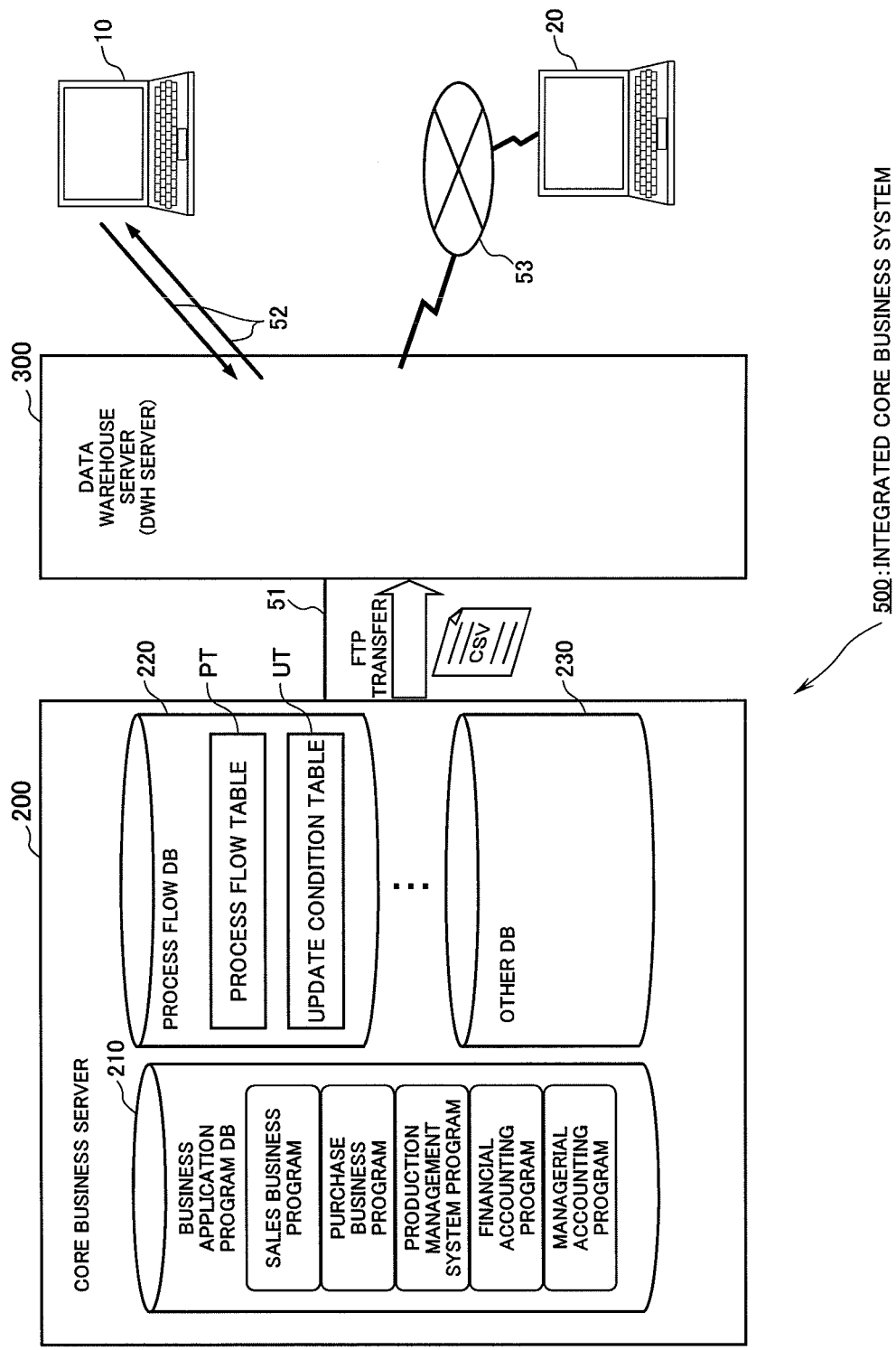
FIG. 1 is a block diagram showing a configuration example of an integrated core business system, according to one embodiment of the present invention.

FIG. 1 is a block diagram showing a configuration example of an integrated core business system 500 according to one embodiment of the present invention. As shown in FIG. 1, the integrated core business system 500 includes a core business server 200, a data warehouse server (DWH server) 300, a client 10 and a client 20. The respective elements constituting the integrated core business system 500 are connected to each other via a communication network.

In the present embodiment, the core business server 200 is connected to the DWH server 300 via a dedicated line 51. Further, the client 10 is connected to the DWH server 300 via a LAN (Local Area Network) 52. Further, the client 20 is connected to the DWH server 300 via the Internet 53.

The core business server 200 is a server managed by a manager of the integrated core business system 500, for example, and has various kinds of functions for managing process data that are data indicating information on various kinds of business processes, such as report information on various kinds of businesses. In this regard, the core business server 200 according to the present embodiment is configured by a general information-processing apparatus provided with an OS (Operating System) and a relational database (relational DB).

Here, the report is the general term of books, slips and the like. Further, the books denote one in which matters concerning accounts of money or goods are filled, and the slips denote data that become a basis for creating books and constitute evidence of transactions and the like on a business. In this regard, the core business server 200 may be configured so as to deal with process data indicating only slip information used to create various kinds of slips, for example.

Further, as shown in FIG. 1, the core business server 200 according to the present embodiment includes: a business application program DB 210; a process flow DB 220; and an other DB 230 for storing various kinds of data required for realizing functions as a general core business server (for example, data used by various kinds of programs stored in the business application program DB 210). In this regard, since the other DB 230 is a portion with no relationship to the present invention in particular, detailed explanation thereof is omitted.

The business application program DB 210 is a storage medium for storing programs used for various kinds of businesses. A sales business management program, a purchase business management program, a production management program, a financial accounting management program, a managerial accounting management program and the like are included in the programs stored in the business application program DB 210.

The process flow DB 220 is a storage medium for storing process flow data configured by various kinds of processes data (or report data) that are collected, marshaled or the like by means of various kinds of information processes using various kinds of programs stored in the business application program DB 210. In the present embodiment, the case where the process flow data containing various kinds of data on a process flow including a plurality of business processes are stored in a process flow table PT of the process flow DB 220 will be described. Further, in the present embodiment, the case where the core business server 200 manages process flow data generated for every process flow in the process flow table PT in an integrated fashion will be described.

In this regard, the core business server 200 may be configured so as to manage, using a plurality of tables, process flow data for every type (will be described later) or for whatever a part of the content of common data (for example, an ordering party or the like, will be described later) is the same, for example.

FIG. 2 is an explanatory drawing showing an example of a storage state of process flow data in the process flow DB 220. As shown in FIG. 2, the process flow data according to the present embodiment contain: a main key section; a reference key section; a type section; a status section; a common data section; and a process unique data section. In this regard, items corresponding to the respective sections of the process flow data (that is, the respective column items in the process flow table PT) denote the kinds of process data that constitute the process flow data. Namely, the data regarding each of the business processes that constitute the process flow are assigned to the respective sections that constitute the process flow data and stored. In this regard, process data regarding one process flow (for example, a series of process flow from a received order from a company to delivery) are stored in the same entry of the process flow table PT (that is, the same line in the process flow table PT). By configuring it in this manner, it is possible to define a correspondence relationship among the respective process data.

Here, the "main key section" is a portion in which main key data that are data for uniquely specifying process flow data are stored among the process flow data. In the present embodiment, the main key section is constructed by a process flow number and a process flow description number. Namely, in the present embodiment, a combination of the process flow number and the process flow description number becomes an identifier (ID) of each of the process flow data. The main key section is updated at the first registration of the process flow. In this regard, the word "at the first registration of the process flow" herein means the time when entry (data line) is added to the process flow data, for example, the time when unregistered process data that are other corresponding process data belonging to a certain process flow are registered. Further, the "update" herein includes addition of data.

In this regard, the "process flow number" is an identifier for specifying one process flow data (that is, one line in the process flow table PT shown in FIG. 2). The process flow number is applied to process data whose predetermined items are the same as each other. In the present embodiment, as the process flow number, the same number is to be applied to process flow data whose type and ordering party are the same in the process flow data.

Further, the "process flow description number" is an identifier for specifying specific process flow data from among the process flow data to each of which the same process flow number is applied. Namely, for example, in the process flow table PT shown in FIG. 2, it is possible to uniquely specify process flow data containing process data, which indicate that an order for businesses with the amount of money "1200" and "2600" is received from an ordering party "T001", in a business process "received order" of a type "inventory sales" of the process flow by means of a combination of a process flow number "000001" and a process flow description number "0010" or "0020".

Subsequently, the "reference key section" is a portion in which reference key data that are data for specifying other process flow data (or other process data) related to the process flow, such as an original transaction with respect to returned goods of sales, in the process flow data are stored. In the present embodiment, the reference key section is configured by a reference number and a reference description number. The reference key section is updated at the first registration of the process flow.

In this regard, a process flow number and a process flow description number of other process flow related to the process flow are stored in the reference number and the reference description number, respectively. However, in the case where there is no other process flow related to the process flow, such as the case of a new transaction, data indicating the same value as the main key section of the same entry are stored in the reference key section (that is, the process flow number and the process flow description number are respectively stored in the reference number and the reference description number). Further, in the case where the reference key section indicates other process data related to the process flow, data for specifying a kind of process data are further provided in the reference key section.

Further, the "type section" denotes a portion in which type data that are data indicating a kind of the process flow such as inventory sales or sample shipment among the process flow data are stored. The type section is updated at the first registration of the process flow. In this regard, the kind of process flow is not limited to inventory sales or sample shipment. Further, it is determined what process is necessary in advance for every kind of process flow (that is, the kinds and the number of business processes included in the kind of process flow are different). In this regard, other plural kinds of process flows will be presented later (see FIG. 11).

Further, the "status section" is a portion in which status data that are data of process flow data representing progress of a process flow (that is, data indicating a progress situation of each of a plurality of business processes included in the process flow) are stored. In the present embodiment, as the status data, with respect to business processes required by the process flow, "0" is set to uncompleted ones, and "1" is set to completed ones, thereby indicating progress of each of the business processes. Namely, for example, in the case where business processes included in a process flow of "inventory sales" are a "received order", "shipment", "delivery", "delivery acceptance inspection" and "sales" as shown in FIG. 2, process unique data (for example, order received date) regarding the business process "received order" are registered. In this case, as the status data, "1" is set to a portion corresponding to "sales", and the other portions remain as an initial state (that is, a state in which "0" is set up).

Namely, the status section according to the present embodiment is updated for each of the business processes. In other words, when process unique data (will be described later) are inputted, more specifically, when it is determined that each of the business processes is completed on the basis of satisfaction of a predetermined status changing condition, the status section is updated. In this regard, although the status changing condition is not limited in particular, in the present embodiment, a condition that "all of process unique data corresponding to one business process are inputted" is stored in a predetermined storage region of the core business server 200 as the status changing condition.

In this regard, in the present embodiment, since different kinds of process flows are stored in the same table, a portion in which unnecessary process data are stored may be generated in a specific process flow of items (line items) that constitute tables. In this case, in the process flow table, a portion in which the unnecessary process data are stored becomes blank data, and "0" is stored in the status data corresponding to the blank data.

Further, the "common data section" is a portion in which common data that are data independent of the business processes of the process flow data, such as an ordering party and a shipment address, (that is, data common among the business processes included in the same process flow) are stored. The common data section is updated at the first registration of the process flow.

Further, the "process unique data section" is a portion in which process unique data that are unique data for each of the business processes included in the same process flow, such as data registered in the order received date and each of the business processes of the process flow data (for example, text data indicating a precaution statement such as "No later than delivery deadline" or "Fragile (Be careful with fragile items)") and the like, are stored. The process unique data section is updated for every business process. Therefore, in the present embodiment, ones dependent upon each business process are the "process unique data" and ones independent from any business process are "common data" of the process flow data.

The above is explanation regarding the process flow data according to the present embodiment. Here, definition of various kinds of terms shown in FIG. 2 will be explained briefly.

First, the "received order" means a state that an order is received from a customer and a contract is made with the customer. Further, the "shipment instruction" means a state that an instruction to ship out goods is carried out to a warehouser or a person for distribution of the goods. Further, the "delivery" means a state that the goods are shipped out from a warehouse and its movement is started. Further, the "acceptance inspection" means a state that acceptance inspection by the customer is completed and ownership of the goods is shifted to the customer. Further, the "sales" means a state that the acceptance inspection by the customer is confirmed and the amount of claims to the customer is determined (=a claim is posted).

Further, the term "acceptance inspection" is also used in the sense of a "business to inspect whether incoming goods or service has a specification as ordered (=quantity, a color or a shape and quality as ordered) or not" or in the sense that "ownership of assets is shifted at completion of the acceptance inspection". In this regard, in order to make clear timing of shift of the ownership of the assets, an event "acceptance inspection" is defined in distinction from delivery on financial accounting (or on legal financial accounting) or on the ERP system.

Further, in the present embodiment, an update condition table UT in which update condition data indicating an update condition of the process flow data (or process flow table PT) are registered is provided in the process flow DB 220.

FIG. 3 is an explanatory drawing showing an example of a storage state of update condition data in the process flow DB 220. As shown in FIG. 3, the update condition data according to the present embodiment contain a name of a business process, a type of the process flow and a process flow data update condition.

Here, the "process flow data update condition" denotes a registration condition of the process status in accordance with a type of the process flow. In the present embodiment, in the case where a process status regarding a business process is added to process flow data, the process flow data update condition denotes a kind of process status (that is, a kind of business process that is to be completed in a process flow) that the process flow data contain on the premise of it. Namely, in the case where the update condition table UT is one shown in FIG. 3, for example, in order to add the process status regarding the business process "delivery acceptance inspection" to the process flow data of the type "inventory sales", there is a need to register the process statuses regarding the business processes "received order", "shipment instruction" and "delivery" defined in advance (that is, business processes in which "1" is set up to each of cells of the same line as the business process name "delivery acceptance inspection" and the type "inventory sales" in FIG. 3) in the process flow data. In this regard, the update condition table UT may be configured so as to be created by a manager of the integrated core business system 500, or so as to be able to be created by a user of each of the clients 10, 20.

The core business server 200 has a function to convert various kinds of data stored in the process flow DB 220 and the other DB 230 into a CSV (Comma Separated Values) format in accordance with a predetermined extract condition, and a function to transmit the converted data to the DWH server 300. In this regard, in the present embodiment, the core business server 200 transfers the data file converted into the CSV format to the DWH server 300 by means of FTP (File Transfer Protocol).

The DWH server 300 is a server managed by a system manager of the present system, for example, and has various kinds of functions for realizing a data warehouse. Here, the "data warehouse" denotes a system to analyze the association among the individual items from among business data (in the present embodiment, the process flow data) such as report data accumulated in time series. Further, the DWH server 300 has a function to convert a file with a CSV format transferred from the core business server 200 into a predetermined data format, and a function to register various kinds of data in a predetermined storage region. In this regard, the DWH server 300 may be configured so as to extract data according to the respective storage regions from the state of the CSV format without conversion of the data format.

Each of the clients 10, 20 is an information-processing apparatus (client terminal) provided with a CPU (Central Processing Unit), a ROM, a RAM, a display section and the like. In the present embodiment, each of the clients 10, 20 has various kinds of applications available to deal with report data, such as a Web browser, spreadsheet software and the like. Further, in the present embodiment, each of the clients 10, 20 has a function to define a query (a search item, a search key, an extract key or the like) for acquiring necessary report data (in the present embodiment, process flow data) from the DWH server 300 in response to an operation input by a user, and a function to transmit the defined query to the DWH server 300, for example.

In the present embodiment, the client 10 has a function to communicate with the DWH server 300 via the LAN, and a function to output the data acquired from the DWH server 300 onto the display section by means of predetermined spreadsheet software.

Further, the client 20 communicates with the DWH server 300 via the Internet, and has a function to output the acquired data from the DWH server 300 to the display section by means of the Web browser.

In this regard, in the present embodiment, each of the clients 10, 20 has a function to output a report with a predetermined form onto the display section included in the client 10, 20 itself on the basis of the process flow data stored in the process flow DB 220 of the core business server 200.

In this regard, the configuration of the integrated core business system 500 is not limited to this, and the clients 10, 20 and the core business server 200 may be configured so as to carry out direct transmission and reception of data via the DWH server 300, for example. Namely, each of the clients 10, 20 may be configured so as to be allowed to directly access to the process flow DB 220.

Next, an operation of the core business server 200 in the integrated core business system 500 will be described with reference to the drawings. In this regard, the content of operations and processes with no relationship to the present invention in particular may be omitted.

Figure 4:
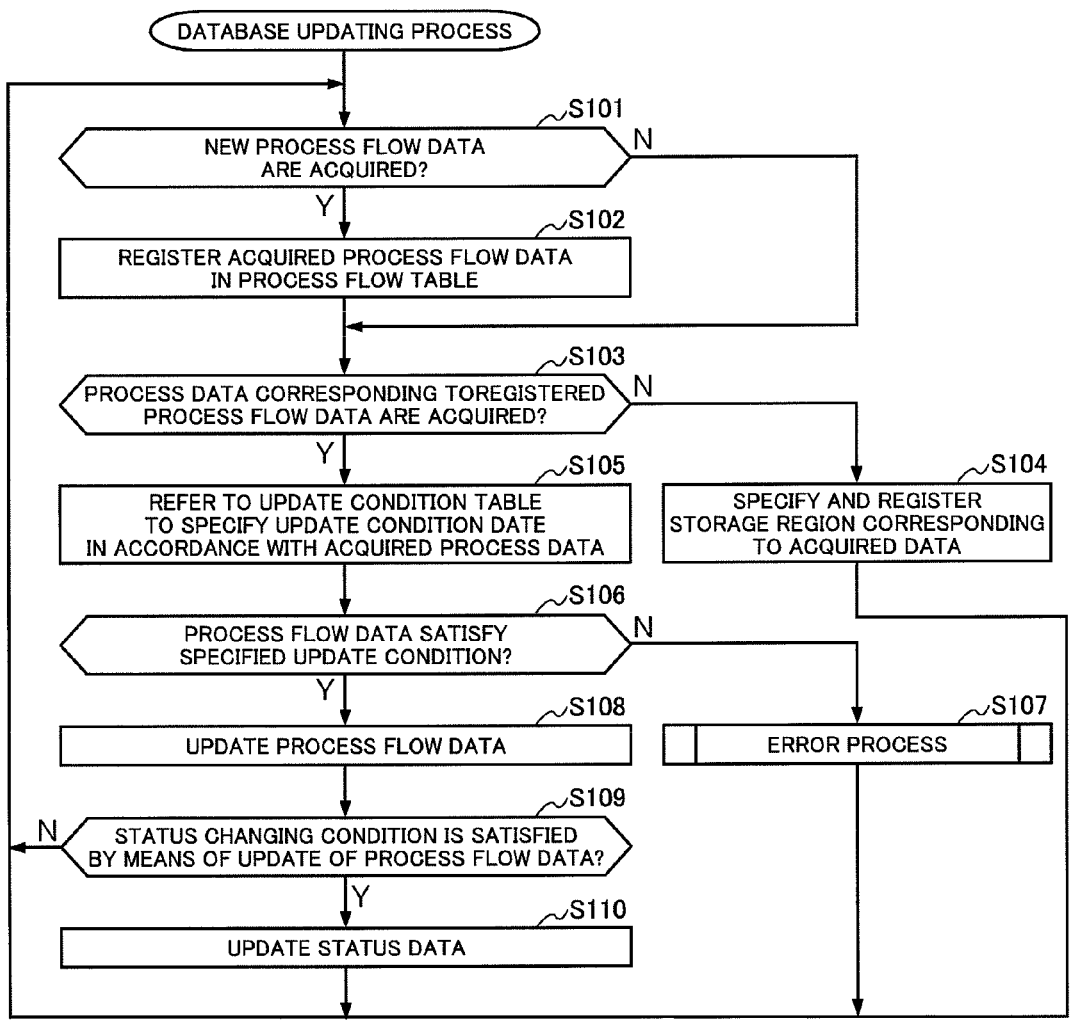
FIG. 4 is a flowchart showing an example of a database updating process.

FIG. 4 is a flowchart showing an example of a database updating process carried out by the core business server 200. In the database updating process, a process to update the process flow data stored in the process flow DB 220 is carried out in the core business server 200. In this regard, in the present embodiment, the core business server 200 acquires, at predetermined timing, various kinds of process statuses and the process flow data collected and/or marshaled by various kinds of information processes using various kinds of programs stored in the business application program DB 210.

In the database updating process, the core business server 200 first determines whether new process flow data (new process flow data) are acquired or not (Step S101). Here, in the case where it is determined that the new process flow data are not acquired ("No" at Step S101), the core business server 200 shifts to a process at Step S103 (will be described later).

On the other hand, in the case where it is determined that the new process flow data are acquired ("Yes" at Step S101), the core business server 200 registers the acquired process flow data in the process flow table PT (Step S102).

Subsequently, the core business server 200 determines whether process data corresponding to the registered process flow data (that is, data regarding the business processes that constitute the process flow) are acquired or not (Step S103).

In this regard, determination of whether the process data acquired by the core business server 200 are registered process data or not is carried out by determining whether process flow data containing a combination of a process flow number and a process flow description number contained in the acquired data are stored in the process flow table PT or not. For that reason, in the present embodiment, there is a need that data constituting the main key section (that is, the process flow number and the process flow description number) are contained in the data (data inputted by a prosecutor of the business or data created by a business application program) acquired by the core business server 200.

Here, in the case where it is determined that the process status corresponding to the process flow data that has been registered is not acquired ("No" at Step S103), the core business server 200 refers to the other DB 230; specifies a storage region corresponding to the acquired data; registers the acquired data (Step S104); and shifts to the process at Step S101.

On the other hand, in the case where it is determined that the process status corresponding to the process flow data that has been registered is acquired ("Yes" at Step S103), the core business server 200 refers to the update condition table UT corresponding to the acquired process status, and specifies the update condition data according to the acquired process status (Step S105). In the present embodiment, the core business server 200 specifies the update condition data on the basis of a kind of business process indicated by the process status and identification information of the process flow (that is, the process flow number and the process flow description number).

When the update condition data are specified, the core business server 200 determines whether the process flow data satisfy an update condition indicated by the specified update condition data or not (Step S106). Namely, the core business server 200 determines whether the acquired process status is registered in the process flow table PT as a part of the process flow data or not on the basis of the process flow data and the update condition data. In the present embodiment, the core business server 200 compares the status section of the process flow data corresponding to the acquired process status with the update condition data; and determines that the process flow data satisfy the update condition in the case where "1" is also set up to all of the status sections with respect to the business process for which "1" is set up in the update condition data.

Here, in the case where it is determined that the process flow data do not satisfy the update condition indicated by the specified update condition data ("No" at Step S106), the core business server 200 carries out a predetermined error process (Step S107), and shifts to the process at Step S101. In this regard, the "error process" is not limited in particular so long as it is a process in which the process flow data are not updated. For example, the "error process" may be a process to temporarily store the process status in a predetermined storage region until the update condition is satisfied, or a process to investigate the cause that the process status, which does not satisfy the update condition, is to be acquired (that is, a process to inform the manager of an error, a process to inform the manager of the content of the update condition that is not satisfied), or the like.

On the other hand, in the case where it is determined that the process flow data satisfy the update condition indicated by the specified update condition data ("Yes" at Step S106), the core business server 200 updates the process flow data registered in the process flow table PT (that is, registers the acquired process status in the process flow table PT) (Step S108).

When the process flow data are updated, the core business server 200 determines whether a predetermined status changing condition regarding the process flow data is satisfied by means of update of the process flow data or not (Step S109). Here, in the case where it is determined that the predetermined status changing condition is not satisfied in accordance with the fact that the process flow data are updated ("No" at Step S109), the core business server 200 shifts to the process at Step S101.

On the other hand, in the case where it is determined that the predetermined status changing condition is satisfied in accordance with the fact that the process flow data are updated ("Yes" at Step S109), the core business server 200 updates the status data contained in the process flow data on the basis of the satisfied status changing condition (Step S110), and shifts to the process at Step S101.

The database updating process according to the present embodiment is terminated by means of an exit operation by the manager of the core business server 200, for example.

Further, the database updating process may be a process carried out in real time, or it may be a batch process carried out every specific unit of time. Further, it may be a process (quasi real time process) with a real time property as a part, so that a real time process is carried out only for a specified period of time, for example.

Next, operations of the core business server 200, the DWH server 300 and the clients 10, 20 in the integrated core business system 500 according to the present embodiment will be described with reference to the drawings. In this regard, the content of operations and processes with no relationship to the present invention in particular may be omitted.

Figure 5:
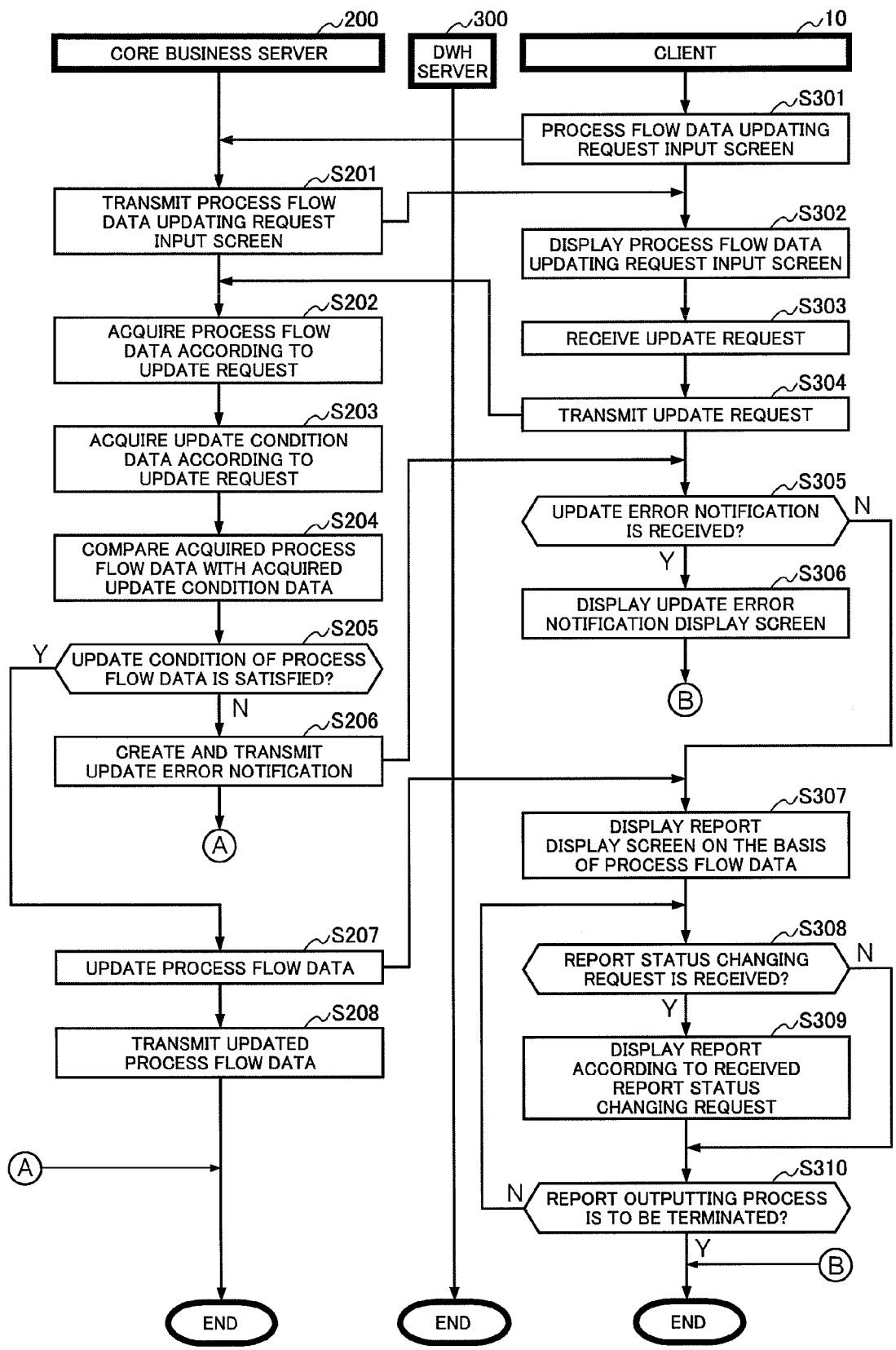
FIG. 5 is a flowchart showing an example of a report outputting process.

FIG. 5 is a flowchart showing an example of a report outputting process carried out by the core business server 200, the DWH server 300 and the client 10. In the report outputting process, the core business server 200 provides process flow data (a part or all of the process flow data) to the client 10 via the DWH server 300, by which a process to display a report on a display screen with which the client 10 is provided is carried out. In this regard, since a kind of communication network of the client 10 is different from that of the client 20 merely, the case of using the client 10 will be described as an example in the present embodiment. Further, since the DWH server 300 according to the present embodiment merely carries out assistance for communication between the core business server 200 and the client 10 (for example, authentication of a client and the like), explanation of an operation of the DWH server 300 is omitted hereinafter.

Further, in the present embodiment, the case where the core business server 200 updates the process flow data in response to a request from the client 10 will also be described. In this regard, in the present embodiment, an update process of the process flow DB 220 explained herein (that is, an update process of the process flow DB 220 in the report outputting process) is one example of the database updating process (see FIG. 4).

In the report outputting process, the client 10 first transmits a request for a process flow data updating request input screen to the core business server 200 in response to an operation input by a user A of the client 10, for example (Step S301).

When the request for the process flow data updating request input screen is received, the core business server 200 transmits a process flow data updating request input screen according to the received request for the process flow data updating request input screen (Step S201).

When the process flow data updating request input screen is received, the client 10 displays the process flow data updating request input screen on the display screen of the display section included in the client 10 itself (Step S302).

FIG. 6 is an explanatory drawing showing an example of a process flow data updating request input screen. As shown in FIG. 6, in the process flow data updating request input screen, a main key data input region 11 for receiving an input of identification information for an update target (which is data corresponding to the main key section of the process flow data, that is, the process flow number and the process flow description number in the present embodiment); a business process input region 12 for receiving an input of a kind of business process indicated by the process status by the user A; a detailed data input region 13 for receiving an input of the content of other process status; a return button 14 for receiving a request to switch the display screen outputted to the display section into other display screen; and an update button 15 for receiving an update request of the process flow data based on the content inputted into each of the input regions (in the present embodiment, the main key data input region 11, the business process input region 12 and the detailed data input region 13); are provided.

When selection of any one of the input regions by means of a cursor P operable by a mouse operation, for example, is received, the client 10 starts to receive an input of text data (containing numerals and characters) into the input region for which the selection is received. Then, when an input of text data by a keyboard, for example, is received, the client 10 displays the received text data in the selected region. Further, when selection of the business process input region 12 is received, the client 10 selectably displays a predetermined business process name in a pull-down format. In this regard, a method of receiving an input of the process status is not limited to this, and, for example, the client 10 may be configured so as to receive a plurality of process statuses, which are packaged in a predetermined data format, at once.

When selection of the update button 15 by a mouse operation, for example, is received, the client 10 determines that an update request for the process flow data by means of the process status constructed by the data inputted in each of the input regions is received (Step S303).

In the case where it is determined that the update request of the process flow data (update request) is received, the client 10 transmits the received update request to the core business server 200 (Step S304).

When the update request is received, the core business server 200 acquires the process flow data according to the received update request from the process flow data registered in the process flow table PT (Step S202). In this regard, the core business server 200 acquires process flow data containing the main key data (that is, data inputted in the main key data input region 11) indicated by the update request as the process flow data according to the update request (that is, the received process status) at this time. Further, the word "acquire" herein means that the process flow data and the update condition data are temporarily stored in a predetermined storage region in order to compare them in a process (will be described later).

When the process flow data according to the update request are acquired, the core business server 200 acquires update condition data according to the update request (Step S203). Here, the update condition data according to the update request mean update condition data that can be specified using the business process indicated by the update request and the type of the process flow data (that is, the business process inputted in the business process input region 12 and the type indicated by the process flow data acquired in the process at Step S202) (see FIG. 3).

When the update condition data are acquired, the core business server 200 compares the acquired process flow data with the acquired update condition data (Step S204), and determines whether the update condition of the process flow data is satisfied or not (Step S205).

Here, in the case where it is determined that the update condition of the process flow data is not satisfied because any one or more item to which "1" is to be set up in the update condition data is not set up to "1" in the status section of the process flow data ("No" at Step S205), the core business server 200 creates update error notification to transmit the created update error notification to the client 10 (Step S206), and terminates the process herein.

When the update error notification is received ("Yes" at Step S305), the client 10 displays an update error notification display screen on the display screen of the display section included in the client 10 itself on the basis of the received update error notification (Step S306).

FIG. 7 is an explanatory drawing showing an example of an update error notification display screen. As shown in FIG. 7, an update error notification display region 21 superimposed and displayed on the process flow data updating request input screen is provided in the update error notification display screen. Here, a detail display button 22 for receiving a request to display details of the update condition in addition to fixed statements for informing the user A of an update error, and a close button 23 for receiving a request to erase the update error notification display region 21 from the display screen are provided in the update error notification display region 21 according to the present embodiment.

In the case where the selection of the detail display button 22 by the user A is received, for example, the client 10 displays a comparison result between the process flow data in the core business server 200 and the update condition data in a form that the user A can recognize (for example, a comparative table indicating a status section of the process flow data and a process flow data update condition of the update condition data).

On the other hand, in the case where it is determined that the update condition of the process flow data is satisfied because all of the items to which "1" is to be set up in the update condition data is set up to "1" in the status section of the process flow data ("Yes" at Step S205), the core business server 200 adds the process status indicated by the update request into the process flow data to update the process flow data (Step S207).

When the process flow data are updated, the core business server 200 transmits the updated process flow data to the client 10 (Step S208), and terminates the process herein.

On the other hand, when the process flow data are received, the client 10 displays a report display screen on the display screen of the display section included in the client 10 itself on the basis of the received process flow data (Step S307).

Figure 8:
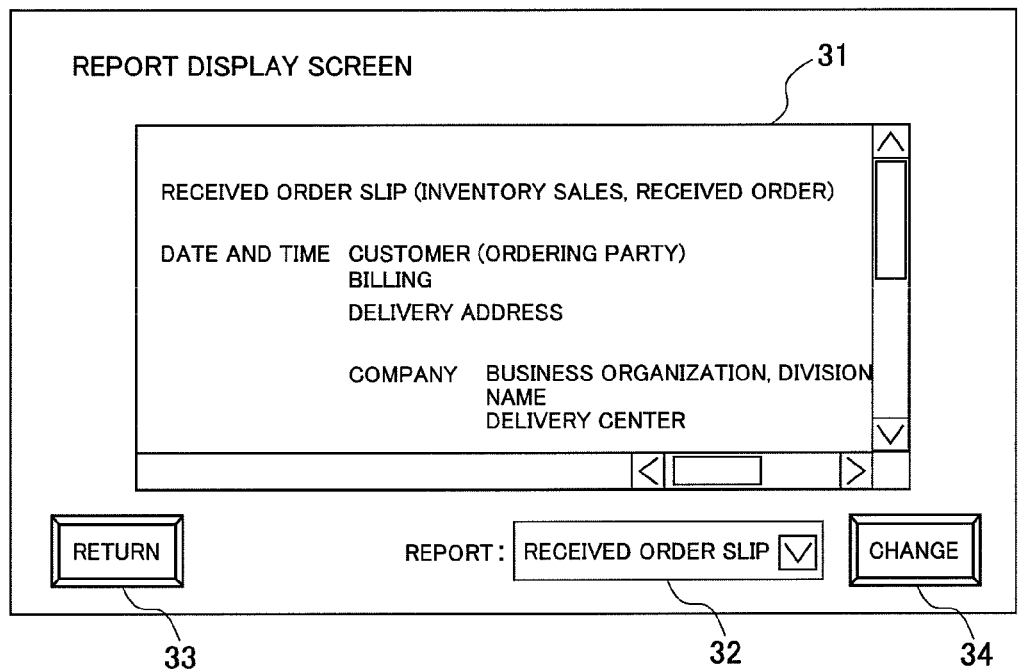
FIG. 8 is an explanatory drawing showing an example of a report display screen.

FIG. 8 is an explanatory drawing showing an example of the report display screen. As shown in FIG. 8, a report display region 31 for displaying a report based upon the process flow data, a report status display region 32, a return button 33 and a change button 34 are provided on the report display screen. In this regard, the client 10 changes a scale size of the report displayed on the report display region 31 in response to an operation of a keyboard included in the client 10 or the like, for example.

Here, a part or all of the process flow data is displayed in the report display region 31 in a predetermined display form. In this regard, in the present embodiment, information for displaying a part or all of the process flow data in a predetermined display form is created by the core business server 200, for example, and is transmitted to the client 10 in the timing at Step S208 in the report outputting process. In this regard, the client 10 may be configured so as to display a part or all of the received process flow data in the report display region 31 in a predetermined display form on the basis of information stored in a storage device included in the client 10 itself.

Further, the report status display region 32 is a region for displaying a kind (or status (hereinafter, referred to as the "status")) of the report displayed in the report display region 31. In this regard, as the status of the report, for example, various ones such as a received order slip, a delivery slip, an acceptance inspection slip, a bill and the like are thought.

Further, the return button 33 is a button for receiving a request to return the display screen to the process flow data updating request input screen. In this regard, the client 10 may be configured so as to transmit, in the case where the selection of the return button 33 by the user A is received, a request to cancel the update of the process flow data based on the update request to the core business server 200 in addition to return of the display screen to the process flow data updating request input screen. In this case, the client 10 may be configured so as to display the process flow data updating request input screen in accordance with selection of the return button 33 at a state that the text data (the selected business process in the business process input region 12) that have been inputted into each of the input regions (in the present embodiment, the main key data input region 11, the business process input region 12 and the detailed data input region 13). By configuring it in this manner, it becomes possible to confirm the content of input by the user A readily.

Further, the change button 34 is a button for receiving a request to change the display content of the report display region 31. Hereinafter, a process to change the display content of the report display region 31 will be described.

When the report display screen is displayed, the client 10 determines whether a report status changing request is received from the user A or not (Step S308).

In the present embodiment, the client 10 first receives selection of the report status display region 32 from the user A. Then, for example, when selection of the report status display region 32 by means of the cursor P operable by a mouse operation is received, the client 10 selectably displays a list of report status names indicating a displayable form of the report in a pull-down format, for example.

In this regard, the report status name displayed herein is received from the core business server 200 together with the process flow data. More specifically, the core business server 200 specifies a report status name indicating a displayable form of the report on the basis of data (report form data) on a form of the report stored in a predetermined storage region in advance and a state of the process flow data (that is, an input state of each line item of the process flow table PT). Namely, for example, in the case where a type of the process flow data transmitted to the client 10 is "inventory sales" and only the process data on the business process "received order" are registered in the process unique data section, the core business server 200 specifies only a "received order slip" as the report status name. Further, in the case where process data regarding the business process "delivery" are registered in addition to a process data regarding a business process "received order", the core business server 200 specifies a "received order slip" and a "delivery slip" as the report status name.

Figure 9:
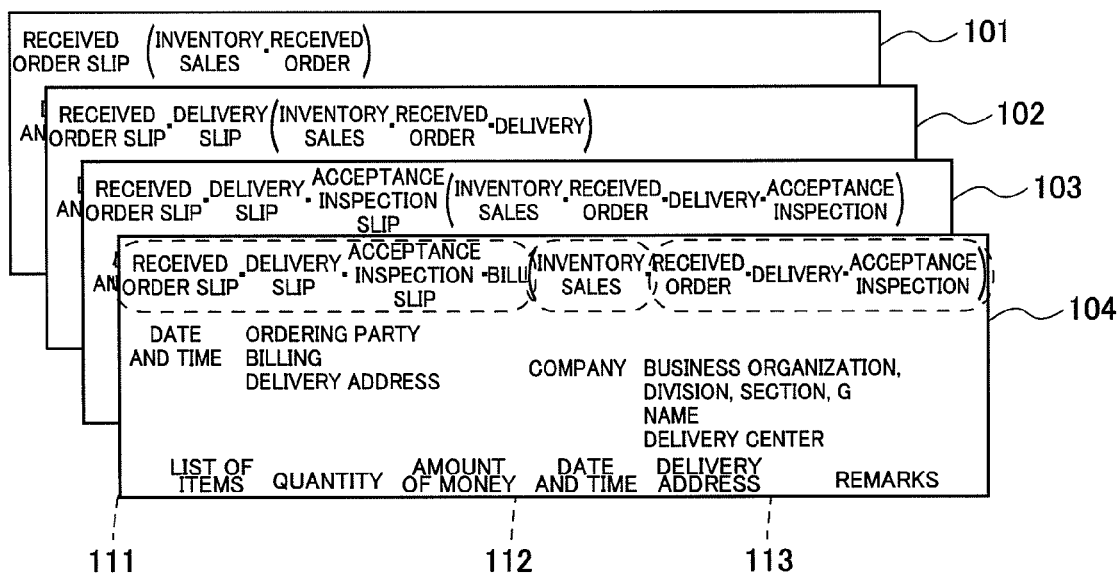
FIG. 9 is an explanatory drawing for explaining transition of a report status based upon a state of the process flow data.

FIG. 9 is an explanatory drawing for explaining transition of a report status based upon a state of the process flow data. In FIG. 9, each of images 101 to 104 is a form of a report (more specifically, a slip) to be displayed on the report display region 31 on the basis of the process flow data. In this regard, the images 101 to 104 are explanatory drawings for explaining transition of a report status, and do not indicate concrete described examples for playing a role as various kinds of reports.

Here, the image 104 will be described as an example. A region 111, a region 112 and a region 113 in the image 104 are respectively regions (in the present embodiment, character string display regions) indicating a report status name, a type of a process flow and a name of a business process of process data contained in the process flow data. In this regard, in the present embodiment, a report status name corresponding to a kind of process data contained in the process flow data is displayed in the region 111.

In this case, as shown by transition from the image 101 to the image 104 in FIG. 9, kinds of report status names (that is, forms of the report that can be displayed on the basis of the process flow data) are increased whenever process data according to each of business processes are registered for one process flow data. This does not mean "whether there is a next kind of report or not", but means that "a status of the report is raised in accordance with a state of the process flow data (that is, kinds of displayable reports are increased)".

Hereinafter, the explanation is continued using the case where the client 10 receives the process flow data containing business processes "received order", "shipment instruction", "delivery" and "delivery acceptance inspection" before the process at Step S307 in the report outputting process as an example. In this regard, in the present embodiment, in the process at Step S307, the client 10 displays, in the report display region 31, a report of a report status name "received order slip" corresponding to the business process "received order", which is positioned at the uppermost level of the business processes "received order", "shipment instruction", "delivery" and "delivery acceptance inspection" in the process flow indicated by the received process flow data (see FIG. 8). In this regard, the client 10 may be configured so as to display the report corresponding to the business process according to the process status that has newly been added to the process flow data in the process at Step S207 in the report display region 31.

In the case where it is determined in the process to determine reception of the report status changing request (Step S308) that the report status changing request is not received from the user A ("No" at Step S308), the client 10 shifts to a process at Step S310 (will be described later).

On the other hand, in the case where it is determined that the report status changing request is received from the user A ("Yes" at Step S308), the client 10 displays the report according to the received report status changing request on the report display region 31 (Step S309). In the present embodiment, the client 10 receives selection of a report status name "delivery slip" corresponding to a business process "delivery" from the user A, and displays the report (delivery slip) corresponding to the business process "delivery" on the report display region 31. In this regard, in this case, the client 10 displays the report status name "delivery slip" on the report status display region 32.

When the report according to the report status changing request is displayed, the client 10 determines whether the report outputting process is to be terminated or not (Step S310). Here, in the case where it is determined that the report outputting process is not to be terminated ("No" at Step S310), the client 10 shifts to the process at Step S308.

On the other hand, in the case where it is determined that the report outputting process is to be terminated, for example, by receiving a predetermined exit operation by the user A ("Yes" at Step S310), the client 10 terminates the process herein.

As explained above, in the embodiment described above, the database (for example, the process flow DB 220) is configured so as to include: the process flow table PT in which process flow data containing various kinds of data on a process flow (for example, the process flow of the type "inventory sales") including a plurality of business processes are registered; and the update condition table UT in which the update condition data indicating the update condition of the process flow data are register, and so that: the process flow data contain the status data, the common data and the process unique data; the status data are data indicating a progress situation of each of a plurality of business processes (for example, the received order, the shipment instruction, the delivery, the delivery acceptance inspection and the sales) included in the process flow; the common data are data (for example, the data indicating ordering party, the amount of money and the like) common among business processes included in the same process flow; the process unique data are data (for example, the order received date and the received order text) unique to each of the business processes included in the same process flow; the status data are updated in the case where the process unique data are updated (for example, the corresponding status data are changed from "0" to "1" in the case where the process unique data are added); and the update condition data are data indicating a state of the status data. Therefore, it becomes possible to reduce a processing load required to update and/or search data in an ERP system.

Namely, it becomes possible to make the amount of I/O data (input and output data) to be generated when to update the data.

FIG. 10 is an explanatory drawing explaining usefulness of a database updating process carried out by the core business server 200 described above.

FIG. 10A is a table indicating a comparison result of the amount of updated data at the time of an input of first process data. Here, a kind of process data to be inputted first (that is, a kind of business process) is not limited in particular. Further, a "conventional form" means a database provided with a table for each of business processes, as shown in FIGS. 12 and 13. Further, a "difference of the amount of data" does not indicate a strict numerical value. The case of updating data stored in a conventional form table is compared with the case of updating data stored in a new form process flow table (that is, the process flow table PT, see FIG. 2, and hereinafter, referred to appropriately as a "new form" in the case of comparing it with the conventional form). In the case where the amount of data treated by the new form becomes larger, it is set to +(plus). In the case where the amount of data treated by the new form becomes smaller, it is set to −(minus). In the case where the amount of data treated by the new form is deemed to be the same as that of the conventional form, it is set to "0".

In this case, at the time of the input of the first process data, the amount of data treated by the new form becomes larger by the amount required for update of the status section. However, since the amount of data of the status section is small, it is thought that there is substantially no large difference between I/O data (input data and output data) in the conventional form and the new form.

On the other hand, FIG. 10B is a table indicating a comparison result of the amount of updated data at the time of an input of process data after a second process. Namely, it is a table indicating a comparison result of the amount of updated data at the time of an input of process data according to business processes included in the process flow for which a part of the main key section, the reference key section, the type section, the status section, the common data section and the process unique data section (for example, process unique data "received order date" and "received order text" according to a business process "received order") has already been inputted in the process flow table PT, for example. In this regard, in the case where other process data (for example, the process data (shipment instruction data) corresponding to the business process "shipment instruction") corresponding to the process data (received order data) registered in the received order table are inputted, for example, the "conventional form" is required to input the "received order number" and the "received order description" indicating the corresponding received order data as the shipment instruction data in addition to the data corresponding to the main key section, the reference key section, the type section, the common data section and the process unique data section according to the present embodiment (see FIG. 2 and FIG. 12) in order to define a correspondence relationship to the inputted process data.

In this case, since the new form updates only the status section and the process unique data section at the time of input of the process data after the second process, the amount of I/O data becomes smaller compared with the conventional form that requires all of the sections other than the status section.

Therefore, since the amount of I/O data of the new form becomes smaller than those of the conventional form, the new form is advantageous with respect to performance of the system.

Namely, since it becomes possible to reduce I/O of the database, it becomes possible to realize reduction of the amount of writing, reduction of a capacity of the whole database, and reduction of a processing load required for a search process of data. In this regard, the fact that a process (process data) does not extend to a plurality of tables also becomes one factor of the reduction of the processing load required for the search process.

Further, the new form has a merit that an input order of process data is set to a random order to an extent. Namely, for example, in the case where the type "inventory sales" is thought, the order of the process flow is limited to an order of a received order, a shipment instruction, delivery, delivery acceptance inspection and sales in the conventional form, and the order cannot be changed. This is because a relationship among business processes is expressed by causing data of the latter business process to have a main key of the former business process in a table structure of the conventional form (for example, the "received order number" and the "received order description" in the shipment instruction table, see FIGS. 12 and 13). On the other hand, data of related business processes are stored in the same entry (that is, the same row of the same table) in a table structure of the new form. For this reason, there is no restriction on the context among business processes, and this makes it possible to rearrange the order of business processes. Namely, for example, in the case where an order of actual businesses is "a received order after a shipment instruction", an input order of process data can be configured in accordance with the order of the actual businesses. For that reason, it is advantageous with respect to progress management (in other words, internal control) over the conventional form. In this regard, more specifically, the business order of a current wholesale business is "a received order after a shipment instruction".

Further, in the new form, it becomes possible to prevent a false process status from being inputted by configuring it so that the content of the update condition data can be set up by a manager or a user of the system, for example. Namely, setup of the update condition data allows update of the process status to be restricted. For this reason, it becomes possible to provide restriction on an order problematic on internal control, such that "sales with no delivery result can be added up", for example, and this makes it possible to improve reliability of the database.

Further, in the new form, it becomes possible to reduce a load required for an inquiry of progress of a process flow. Namely, in the case where it is confirmed how far the process flow proceeds, there is a need to confirm registration statuses of all tables in order from a table for a start slip to a table for a final slip in the table structure of the conventional form. For example, in the case where a type "inventory sales" is thought as an example, there is a need to confirm five tables for a received order, a shipment instruction, delivery, delivery acceptance inspection and billing. On the other hand, since a progress situation of a process flow is held in the table structure of the new form as the "status section", it becomes possible to confirm progress only by means of inquiry of one table and one entry. This is advantageous when to use or develop an inquiry screen of a progress situation.

Further, in the embodiment described above, the database (for example, the process flow DB 220) is configured so that the database is provided in a process flow data management server (for example, the core business server 200) that manages the process flow data generated for every process flow; and the process flow data management server includes a process flow data providing section for providing a part or all of the process flow data to a client terminal (for example, the clients 10, 20) in response to a request from the client terminal. Therefore, it becomes possible to establish a system in which a processing load required for providing data regarding a business flow (for example, process flow data indicating report information necessary for creation of the report) is reduced compared with a conventional one.

Further, in the embodiment described above, the process flow data management server (for example, the core business server 200) is configured so as to: receive an input of a process status that is data regarding each of a plurality of business processes; determine whether the received process status (for example, the process status indicated by the update request of the process flow data) is to be registered as a part of the process flow data on the basis of the update condition data (for example, determination whether the process flow data satisfy the update condition or not, see Step S106 in FIG. 4 and Step S205 in FIG. 5); and update the process flow data registered in the process flow table PT in the case where it is determined that the process status is to be registered. Therefore, it is possible to prevent false data from being registered. Namely, in the case where the user wishes "delivery acceptance inspection" that is a kind of business process can always be registered only after data regarding business processes "received order", "shipment instruction" and "delivery" are registered in view of data management, for example, it is possible to restrict update of the process flow data as wished by the user only by setting up the update condition data.

In this regard, although it has not been mentioned in the embodiment described above in particular, the process flow data management server (for example, the core business server 200) may be configured so as to: in the case where it is determined that the process status is not registered, specify an unsatisfaction update condition, which is an update condition that has not been satisfied; inform the client terminal (for example, the clients 10, 20) of the specified unsatisfaction update condition; determine whether the specified update condition is satisfied as the unsatisfaction update condition or not at predetermined timing; and register the process status corresponding to the update condition in the process flow table PT in the case where it is determined that the update condition specified as the unsatisfaction update condition is satisfied.

By configuring it in this manner, it becomes possible to prevent a user of a client terminal from being to input the same data multiple times. Namely, so long as the user that has been informed of the unsatisfaction update condition carries out an operation for satisfying the unsatisfaction condition, the process status that has already been inputted is registered in the process flow table. Therefore, there is no need to input the process flow data again. Further, the process flow data management server does not have to carry out processes necessary for specification of the process flow data corresponding to the received process status and determination whether the update condition is satisfied or not again. Therefore, it becomes possible to reduce the number of times of execution of the same process.

In this regard, although it has not been mentioned in particular in the embodiment described above, the database (for example, the process flow DB 220) may be configured so as to include a progress situation determining condition table in which progress situation determining condition data are registered, the progress situation determining condition data being data indicating a determination condition of a progress situation of the process flow, and so that the process flow data management server (for example, the core business server 200) determines whether the status data (for example, the data stored in the status section of the process flow table PT, see FIG. 2.) satisfies the progress situation determining condition or not on the basis of the progress situation determining condition, and informs the client terminal (for example, the clients 10, 20) of a progress situation according to the progress situation determining condition determined to be satisfied.

FIG. 11 is an explanatory drawing showing an example of a storage state of progress situation determining condition data stored in the progress situation determining condition table. As shown in FIG. 11, the progress situation determining condition data according to the present embodiment contain types of process flow and progress situation determining conditions according to each of the types of the process flow.

Here, in the types of the process flow, various ones of different business processes such as sample shipment, service sales, a change of names (sales), a change of names (shipment), returned goods of sales (reference of original transaction), returned goods of sales (no reference of original transaction), adjustment of sale proceeds (plus), adjustment of sale proceeds (minus) and the like are thought in addition to the inventory sales described above.

Further, the "progress situation determining condition" is one indicating criteria for determination of a progress situation of a process flow, and in the present embodiment, "1" is set up to a business process necessary for every type of the process flow (for example, a business process set up by type in advance among a received order, a shipment instruction, delivery, delivery acceptance inspection and sales).

The core business server 200 determines that the entry of the process flow data is in a "complete" state (that is, determines that the process flow indicated by the process flow data is completed) in the case where the state of the status section corresponds with the progress situation determining condition data of the process flow data stored in the process flow table PT; and carries out a process (informing process) to inform that effect of a predetermined client (for example, the clients 10, 20).

By configuring it in this manner, it becomes possible to establish a system capable of determining a business performance status. In particular, since merely comparison between the status data and the progress situation determining condition data contained in the process flow data enables a process to determine the business performance status, it is possible to reduce a processing load required for determination of the business performance status compared with a conventional one that has need to refer to an input status of data stored in a plurality of tables.

In this regard, start timing of the determining process or the informing process of a progress situation may be the time when there is a request from a client terminal, or the time set up in advance.

Further, in the example of the progress situation determining condition table as described above, it is configured so that the progress situation determining condition data contain a completion condition for determining whether the process flow is completed or not. Therefore, it becomes possible to establish a system capable of readily determining completion of a series of businesses.

In this regard, the progress situation determining condition data are not limited to one for determining whether the process flow is in a "completion" state or not, and, for example, it may be configured so as to contain data for determining whether it is in a "50% completion" state or not. Further, it may be configured so that the progress situation determining condition data denote a kind of process data to be inputted until a predetermined period of time elapses from the time when the first process data are inputted.

Further, it may be configured so that the progress situation determining condition table is caused not to have a function to determine "whether all of data to be inputted are inputted or not" as described above, but to have a function to restrict an input of data "so as not to input data that are not to be input". In this case, for example, the core business server 200 may be configured so as to compare, in the case where the process data to be added are process unique data when to update the process flow table PT, a kind of the process unique data to be added with the progress situation determining condition table; and not to update the process flow table in the case where the kind of the process unique data to be added is one corresponding to a business process for which "1" is not set up to the progress situation condition table.

In this regard, although it has not been mentioned in the embodiment described above in particular, the database (for example, the process flow DB 220) may be configured so that restriction regarding a change of the content of data is provided in at least a part of data that have already been registered in the process flow table PT in the case where predetermined data are inputted.

Namely, for example, it may be configured so that the common data section in the process flow table PT (for example, deletion or overwriting of data) can be changed before the process unique data regarding the process "delivery acceptance inspection" are registered in the process flow table PT with which the process flow DB 220 is provided, but the common data section cannot be changed arbitrarily after the process unique data regarding the process "delivery acceptance inspection" are registered in the process flow table PT. In this case, for example, it may be configured so that the user adds restriction, such as a password to be inputted or a condition to be satisfied, in the case where the content of the common data section is changed. By configuring it in this manner, it is possible to prevent contradiction in the whole data from occurring together with a change of a part of the data (that is, prevent consistency of related data from lacking together with modification of data that has been inputted).

INDUSTRIAL APPLICABILITY

According to the present invention, it is useful to establish an ERP system capable of reducing a processing load required for update and/or search of data.

EXPLANATION OF REFERENCE NUMERALS

PT process flow table
UT update condition table
10 client
20 client
51 dedicated line
52 LAN
53 Internet
200 core business server
210 business application program DB
220 process flow DB
230 other DB
300 DWH server
500 integrated core business system

The invention claimed is:

1. A data management server for providing various kinds of data to a client terminal, the data management server comprising:
 a process flow data storage medium for storing process flow data containing various kinds of data on a process flow and update condition data indicating an update condition of the process flow data, the process flow containing a plurality of business processes, the process flow data being registered in a process flow table;
 a process flow data updating section for updating the process flow data in accordance with a progress situation of the process flow;
 a process flow data providing section for providing, to the client terminal, at least a part of the process flow data in response to a request from the client terminal,
 a process status receiving section for receiving an input of a process status, the process status being data of each of the plurality of business processes;
 a register determining section for determining whether the process status received by the process status receiving section is registered as a part of the process flow data on the basis of the update condition data;
 an unsatisfaction update condition specifying section for specifying an unsatisfaction update condition when the register determining section determines that the process status is not to be registered, the unsatisfaction update condition being an update condition that has not been satisfied;
 an informing section for informing the client terminal of the unsatisfaction update condition specified by the unsatisfaction update condition specifying section; and
 a satisfaction determining section for determining whether the update condition specified as the unsatisfaction update condition is satisfied at a predetermined timing,
 wherein the process flow data are data containing status data, common data and process unique data,
 wherein the status data are data indicating a progress situation of each of a plurality of business processes included in the process flow,
 wherein the common data are data common among business processes included in the process flow,
 wherein the process unique data are data unique to each of the business processes included in the process flow,
 wherein the update condition data are data indicating a state of the status data,
 wherein the process flow data updating section updates the process flow data on the basis of the update condition data,
 wherein the process flow data updating section updates the process flow data registered in the process flow table when the register determining section determines that the process status is to be registered, and
 wherein the process flow data updating section registers a process status corresponding to the update condition in the process flow table when the satisfaction determining section determines that the update condition specified as the unsatisfaction update condition is satisfied.

2. A non-transitory computer-readable medium having a data managing program for controlling an operation of a data management server so as to provide various kinds of data to a client terminal, the data managing program causing the data management server to execute:
 a process flow data updating process to update process flow data stored in a process flow data storage section in accordance with a progress situation of a process flow, the process flow data storage section storing therein process flow data containing various kinds of data on the process flow and update condition data indicating an update condition of the process flow data, the process flow containing a plurality of business processes, the process flow data being registered in a process flow table;
a process flow data providing process to provide, to the client terminal, at least a part of the process flow data in response to a request from the client terminal,
a process status receiving process to receive an input of a process status, the process status being data of each of the plurality of business processes;
a register determining process to determine whether the process status received, in the process status receiving process, is registered as a part of the process flow data on the basis of the update condition data;
an unsatisfaction update condition specifying process to specify an unsatisfaction update condition when the register determining process determines that the process status is not to be registered, the unsatisfaction update condition being an update condition that has not been satisfied;
an informing process to inform the client terminal of the unsatisfaction update condition specified in the unsatisfaction update condition specifying process; and
a satisfaction determining process to determine whether the update condition specified as the unsatisfaction update condition is satisfied at a predetermined timing,
wherein the process flow data are data containing status data, common data and process unique data,
wherein the status data are data indicating a progress situation of each of a plurality of business processes included in the process flow,
wherein the common data are data common among business processes included in the process flow,
wherein the process unique data are data unique to each of the business processes included in the process flow,
wherein the update condition data are data indicating a state of the status data,
wherein, in the process flow data update process, the data management server is caused to execute a process to update the process flow data on the basis of the update condition data,
wherein, in the process flow data update process, the data management server is caused to execute a process to update the process flow data registered in the process flow table when the register determining process determines that the process status is to be registered, and
wherein, in the process flow data update process, the data management server is caused to execute a process to register a process status corresponding to the update condition in the process flow table when the satisfaction determining process determines that the update condition specified as the unsatisfaction update condition is satisfied.

* * * * *